United States Patent [19]

Sitnik

[11] Patent Number: 6,160,570
[45] Date of Patent: Dec. 12, 2000

[54] DIGITAL TELEVISION SYSTEM WHICH SELECTS IMAGES FOR DISPLAY IN A VIDEO SEQUENCE

[75] Inventor: Eran Sitnik, Ossining, N.Y.

[73] Assignee: U.S. Philips Corporation, New York, N.Y.

[21] Appl. No.: 09/062,939

[22] Filed: Apr. 20, 1998

[51] Int. Cl.$^7$ .................................................. H04N 7/00
[52] U.S. Cl. ................ 348/1; 348/7; 348/9; 348/12; 348/13
[58] Field of Search .............................. 348/6, 7, 12, 13, 348/906, 9; 455/5.1, 2

[56] References Cited

U.S. PATENT DOCUMENTS

| | | | |
|---|---|---|---|
| 5,027,400 | 6/1991 | Baji et al. | 380/20 |
| 5,550,578 | 8/1996 | Hoarty et al. | 348/7 |
| 5,600,364 | 2/1997 | Hendricks et al. | 348/1 |
| 5,758,257 | 5/1998 | Herz et al. | 455/2 |
| 5,758,259 | 5/1998 | Lawler | 455/5.1 |
| 5,931,908 | 8/1999 | Gerba et al. | 709/219 |
| 5,949,476 | 9/1999 | Pocock et al. | 348/24 |

*Primary Examiner*—Nathan Flynn
*Assistant Examiner*—Kieu-Oanh Bui
*Attorney, Agent, or Firm*—Edward W. Goodman

[57] ABSTRACT

A digital television system includes a memory which stores a user profile and computer-executable process steps, and a display processor which receives video data and which outputs the video data as a video sequence. A controller receives video data corresponding to at least two alternative images. The controller executes the process steps stored in the memory so as to select one of the alternative images based on information stored in the user profile, and to cause the display processor to include the selected one of the alternative images within the video sequence.

14 Claims, 3 Drawing Sheets

DIGITAL TELEVISION SYSTEM WHICH SELECTS IMAGES FOR DISPLAY IN A VIDEO SEQUENCE

BACKGROUND OF THE INVENTION

1. Field of the Invention

The present invention is directed to a digital television system which selects images for display to a user. In particular, the invention is directed to a digital television system which stores a profile for the user and which selects, based on the stored profile, one of two or more alternative images for display within a video sequence.

2. Description of the Related Art

Heretofore, the range of video signal processing options available within a television receiver has been relatively limited. That is, in conventional television systems, most video signal processing is performed at the television station, as opposed to in the television receiver itself. This is particularly true in the case of inserting images, such as graphics, advertisements, etc., within a video sequence to be displayed by the television receiver.

More specifically, in conventional television systems, images are inserted into a video sequence at the television station, whereafter, the video sequence, including the inserted images, is transmitted to all television receivers within range of the station. With the advent of satellite broadcasting and cable television, however, inserting images at a single location, such as a television station, can have disadvantages, particularly with regard to television advertising. For example, television "superstations", such as WGN of Chicago and WPIX of New York, are available in many cities in the U.S.; however, those stations contain local advertising which is specific to the city in which the station is located. This advertising is, therefore, essentially wasted on all those outside the immediate viewing area. Thus, by inserting advertising at a single location, such stations are not able to take full economic advantage of the advertising potential of their television programs.

Moreover, as consumer tastes have become more fragmented, inserting television advertisements at a single location has become less desirable from a marketing standpoint. That is, many television advertisers now target their advertisements to a very specific audience or "demographic". However, while it is possible to generalize the likes and dislikes of a target demographic to a certain extent, there is a limit as to the accuracy of this generalization. As a result, under current systems, in which television advertising is inserted at a single location, such advertising may not always be effectively targeted to the consumer.

Thus, there exists a need for a television system which inserts video images, such as television advertisements, within a video sequence, and in which those video images are narrowly tailored to a particular viewer or audience.

SUMMARY OF THE INVENTION

The present invention addresses the foregoing need by providing a digital television system (i.e., a digital television receiver or a digital television receiver in combination with a set-top box) which stores a user profile containing information concerning the user, such as the user's sex, age, preferences, location, etc., and which selects one of at least two alternative images for display in a video sequence based on the information stored in the user's profile. For example, in accordance with the invention, the profile may contain information indicating that the user has children under the age of thirteen. Accordingly, in this case, the digital television system may select a toy advertisement, as opposed to an electronics advertisement, for display during a television program.

Thus, according to one aspect, the present invention is a digital television system that includes a memory which stores a user profile and computer-executable process steps. Also included within the digital television system are a display processor which receives video data and which outputs the video data as a video sequence, and a controller which receives video data corresponding to at least two alternative images. In the invention, the controller executes the process steps stored in the memory so as to select one of the alternative images based on information stored in the user profile, and to cause the display processor to include the selected one of the alternative images within the video sequence.

By selecting one of at least two alternative images for display in the video sequence based on the user's profile, the invention is able to tailor the video sequence to the user. For example, the invention is able to provide the user with advertisements, graphics, or the like, which are appropriate for the user. Moreover, the invention is able to synchronize the display of products within a television program with displays of commercials of those products during the television program.

In preferred embodiments of the invention, the information stored in the user profile is based on the user's television viewing habits, which are determined by the controller by monitoring programming displayed on the digital television system over a predetermined period of time. By virtue of this feature of the invention, it is possible to automate the profile generation process and to provide a more accurate user profile than might otherwise be available.

In particularly preferred embodiments of the invention, the digital television system includes an audio decoder which receives audio data corresponding to the at least two alternative images, and which decodes selected portions of the audio data for output along with the selected one of the alternative images. By virtue of these features of the invention, selected audio data corresponding to the selected video image may also be output via the digital television system.

According to another aspect, the present invention is a method, for use in a digital television system, of locally superimposing images in a video sequence. The method includes storing, in a memory of the digital television system, a user profile containing information relating to a user of the digital television system, and receiving video data defining the video sequence and video data including at least two alternative images for display within the video sequence. In addition, the method includes selecting one of the alternative images based on the information in the user profile, and displaying the video sequence together with the one of the alternative images selected in the selecting step.

According to still another aspect, the present invention is a digital television system that includes a transmitter which transmits coded data, where the coded data comprises video data for a video sequence and video data which includes at least two alternative images for display within the video sequence. A digital television receiver stores a user profile comprising information on a user of the digital television receiver, decodes the coded data received from the transmitter, and selects one of the alternative images for display within the video sequence based on the user profile.

By selecting an image based on a user profile, it is possible, among other things, to advertise to a narrow or specific group of consumers or to consumers located in a particular geographic area, to tailor advertising for display at different times of the day, and to synchronize commercials with products shown during a television program.

According to still another embodiment, the present invention is a transmitter for transmitting video data from a centralized location to one or more digital television systems. The video data (i) defines a video sequence for display on a digital television, (ii) includes at least two alternative images for display within the video sequence, and (iii) includes additional information associated with each alternative image. In this embodiment of the invention, the additional information associated with each alternative image corresponds to information stored in a user profile of the digital television receiver.

This brief summary has been provided so that the nature of the invention may be understood quickly. A more complete understanding of the invention can be obtained by reference to the following detailed description of the preferred embodiments thereof in connection with the attached drawings.

DESCRIPTION OF THE PREFERRED EMBODIMENTS

Figure 1:
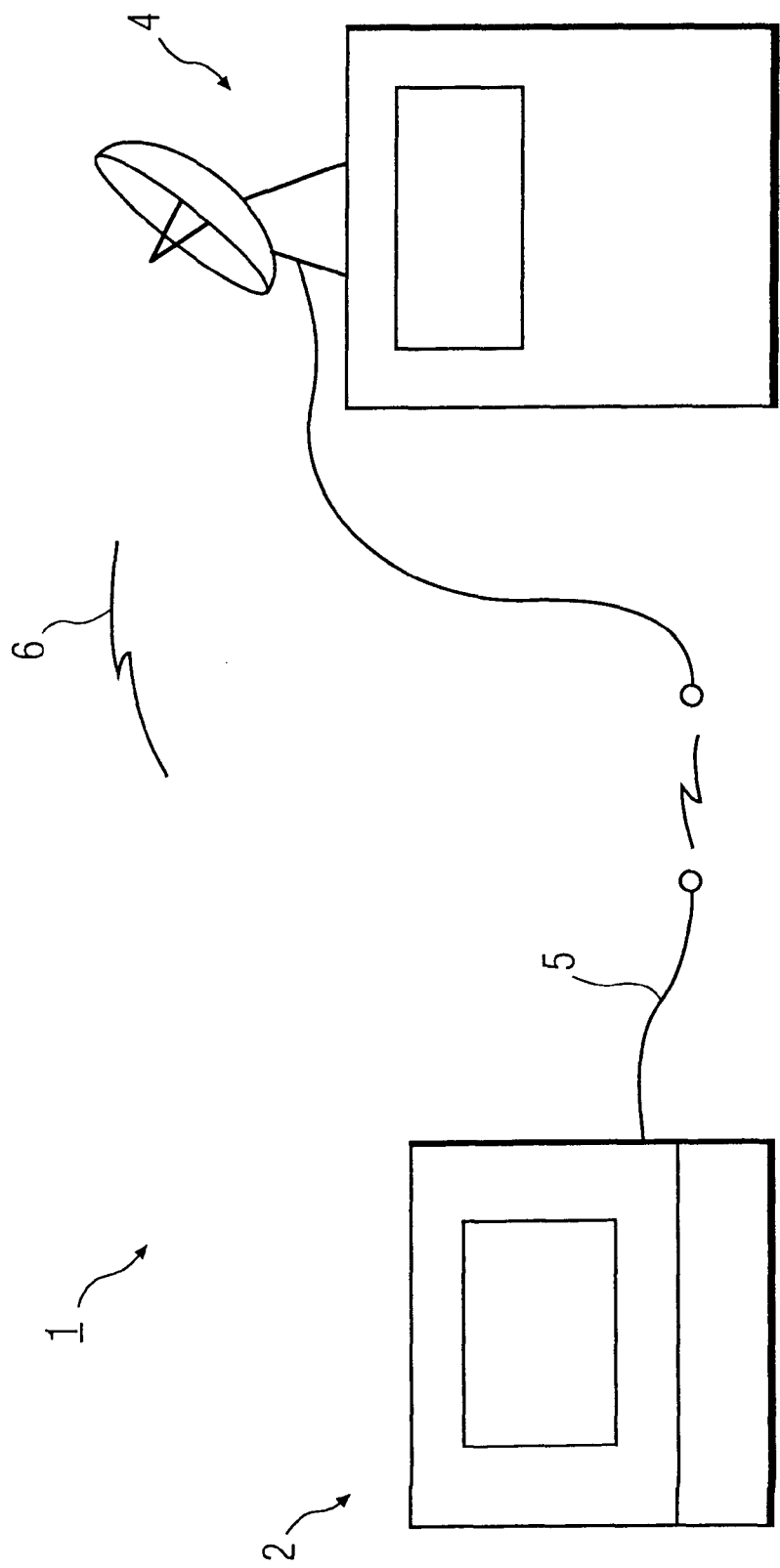
FIG. 1 shows a digital television system in which the present invention may be implemented.

FIG. 1 shows an example of a television transmission system in which the present invention may be implemented. As shown in FIG. 1, television system 1 includes a digital television receiver 2, transmitter 4, and a transmission medium 5. The transmission medium 5 may be a coaxial cable, fiber-optic cable, or the like, over which video and audio data may be transmitted between the transmitter 4 and the digital television receiver 2. As shown in FIG. 1, the transmission medium 5 may include a radio frequency (hereinafter "RF") link, or the like, between portions thereof. In addition, data may be transmitted between the transmitter 4 and the digital television receiver 2 solely via an RF link, such as RF link 6.

The transmitter 4 is located at a centralized facility, such as a television station or studio, from which the video and audio data may be transmitted to users' digital television receivers. In preferred embodiments of the invention, this video and audio data is coded, preferably at the centralized facility, prior to transmission. A preferred coding method for the audio data is AC3 coding. A preferred coding method for the video data is Motion Picture Experts Group (hereinafter "MPEG") coding, and, in particular, MPEG-2 coding. It should be noted, however, that the invention can be implemented using other coding methods, such as DVB or the like.

The video data comprises a video sequence, which may include one or more television programs and television advertising (i.e., commercials) interspersed among the television programs, while the audio data comprises sound associated with corresponding portions of the video data. In accordance with the invention, the data transmitted from the transmitter 4 also includes synchronized video signals comprising at least two (i.e., two or more) alternative images which may be selected for display on the digital television receiver 2, together with corresponding audio data, if any. In preferred embodiments of the invention, identification data is transmitted together with each of the alternative images (and audio data) so as to identify the images as such, together with other information that is used during the image selection process described below.

The alternative images described above comprise alternate portions of the same video sequence. For example, the alternative images may comprise two different commercials for display at the same time in different cities, e.g., one commercial directed to Chicago viewers and one commercial directed to New York viewers. On the other hand, the alternative images may comprise different objects for display within a video sequence. In this regard, television advertisers often advertise their products subliminally using "product placement", meaning placement of products actually within a television program (e.g., placing an American Express® logo on a billboard during an episode of "Seinfeld") as opposed to within a commercial displayed between portions of the television program (e.g., placing an American Express® commercial between portions of an episode of "Seinfeld"). This product placement strategy may be enhanced by the present invention in that the alternative images noted above may comprise images of different products, e.g., different billboard signs, can labels, etc., which can actually be displayed within a television program. Moreover, the invention makes it possible to synchronize product placement with corresponding television commercials, thereby providing for more effective advertising. Which of the alternative images (and corresponding audio data, if any) is actually displayed is selected "locally" by the digital television receiver 2 in the manner described below.

Figure 2:
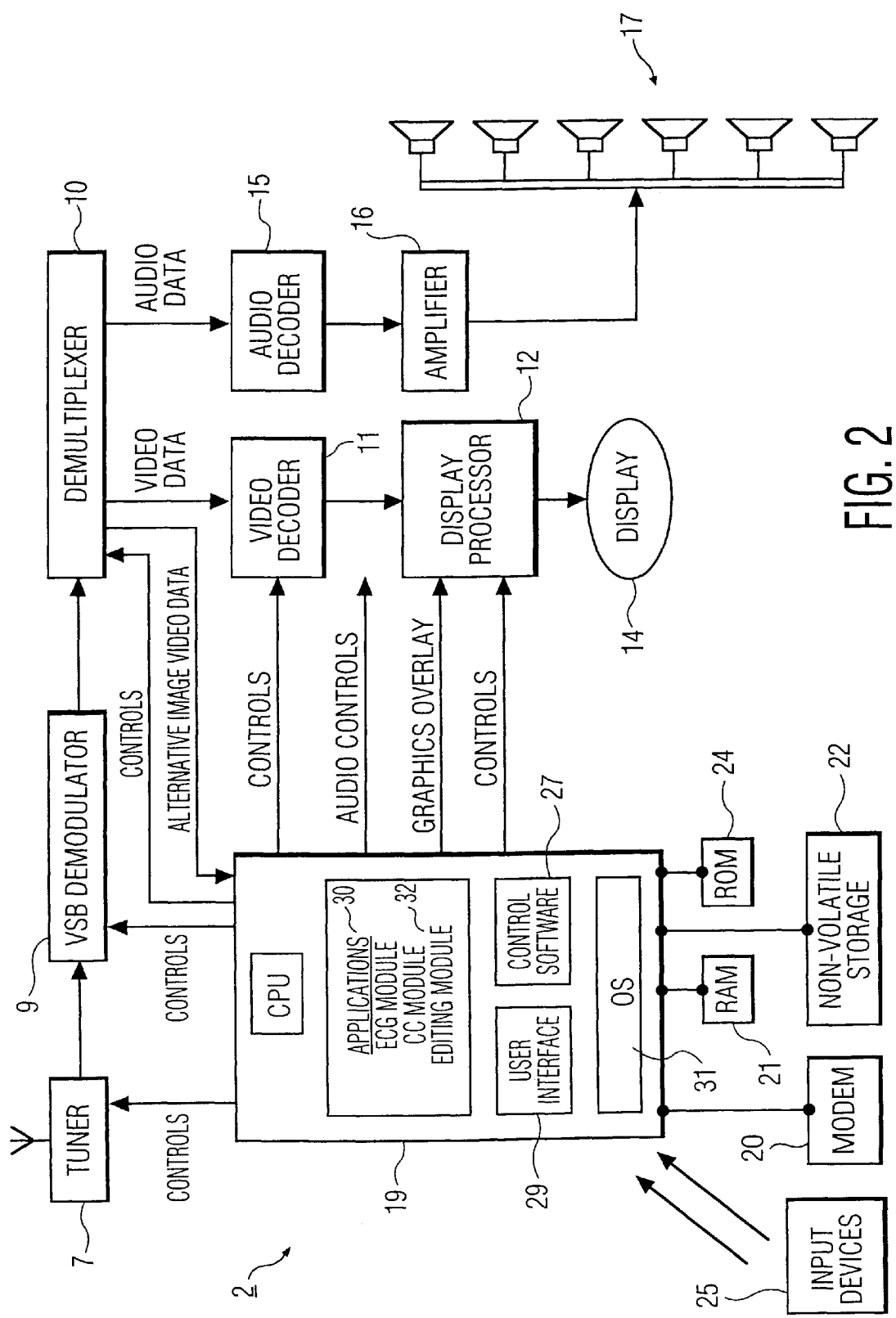
FIG. 2 shows a block diagram of the digital television receiver shown in FIG. 1.

FIG. 2 shows a block diagram of the digital television receiver 2. As shown in the figure, the digital television receiver 2 includes a tuner 7, a VSB demodulator 9, a demultiplexer 10, a video decoder 11, a display processor 12, a display screen 14, an audio decoder 15, an amplifier 16, speakers 17, a central processing unit (hereinafter "CPU") 19, a modem 20, a random access memory (hereinafter "RAM") 21, a non-volatile storage 22, a read-only memory (hereinafter "ROM") 24, and input devices 25. Each of these features of the digital television receiver 2 is well-known to those of ordinary skill in the art; however, descriptions thereof are nevertheless provided herein for the sake of completeness.

In this regard, the tuner 7 comprises a standard analog RF receiving device which is capable of receiving an analog signal that includes the video and audio data described above. Specifically, the tuner 7 receives this signal from either the transmission medium 5 or via the RF link 6 over a particular frequency channel. Which channel the tuner 7 receives the signal on, is dependent upon control data received from the CPU 19. This control data is based on data input via one or more of the input devices 25. In this regard, the input devices 25 can comprise any type of well-known television input device, such as a remote control, a keyboard, a knob, a joystick, etc.

The demodulator 9 receives the input analog signal from the tuner 7 and, based on control signals received from the CPU 19, converts the analog signal into digital data packets. These data packets are then output to the demultiplexer 10, preferably at a high speed, such as 20 megabits per second. The demultiplexer 10 receives the data packets output from the demodulator 9 and "desamples" the data packets, meaning that the packets are output either to the video decoder 11, the audio decoder 15, or the CPU 19 depending upon an identified type of the packet. Specifically, the CPU 19 identifies whether data packets from the demultiplexer 10 include video data, audio data, or "alternative image" video data based on identification data stored in those packets, and causes the data packets to be output accordingly. That is, video data packets are output to the video decoder 11, audio data packets are output to the audio decoder 15, and alternative image data packets (i.e., data packets containing video data for the alternative images described above) are output to the CPU 19.

In an alternative embodiment of the invention, the data packets are output from the demodulator 9 directly to the CPU 19. In this embodiment, the CPU 19 performs the tasks of the demultiplexer 10, thereby eliminating the need for the demultiplexer 10. Specifically, in this embodiment, the CPU 19, receives the data packets, desamples the data packets, and then outputs the data packets based on the type of data stored therein. That is, as was the case above, video data packets are output to the video decoder 11 and audio data packets are output to the audio decoder 15. In this embodiment, however, the CPU 19 retains the alternative image data packets, rather than outputting those packets.

The video decoder 11 decodes video data packets received from the demultiplexer 10 (or from the CPU 19) in accordance with control signals, such as timing signals and the like, received from the CPU 19. In preferred embodiments of the invention, the video decoder 11 is an MPEG-2 decoder; however, any decoder may be used so long as the decoder is compatible with the type of coding used to code the video data. The decoded video data is then transmitted to the display processor 12.

The display processor 12 can comprise a microprocessor, microcontroller, or the like, which is capable of forming images from video data and of outputting those images to the display screen 14. In operation, the display processor 12 outputs a video sequence in accordance with control signals received from the CPU 19 based on the decoded video data received from the video decoder 11 and based on graphics data received from the CPU 19. More specifically, the display processor 12 forms images from the decoded video data received from the video decoder 11 and from the graphics data received from the CPU 19, and inserts the images formed from the graphics data at appropriate points in the video sequence defined by the images formed from the decoded video data. With regard to the graphics data, the display processor 12 uses image attributes, chroma-keying methods and region-object substituting methods in order to include (i.e., to superimpose) the graphics data in the data stream for the video sequence.

The graphics data output by the CPU 19 may correspond to any number of different types of images, such as station logos or the like. In the context of the present invention, however, these images include at least one of the alternative images transmitted to the CPU 19 in the alternative image data packets. That is, as described in more detail below, the CPU 19 selects one of the alternative images and then transmits the selected image to the display processor 12, together with control data including information as to when and where the selected image is to be displayed within a video sequence. This control data includes, but is not limited to, screen placement coordinates (e.g., where on a display screen the image is to be displayed), scaling and timing information for the image (e.g., the size of the image and times at which the image is to displayed), and presentation attributes (e.g., image color). In preferred embodiments of the invention, such control data is included in the data packet for each alternative image, and is merely transmitted by the CPU 19 to the display processor 12 following selection of an alternative image by the CPU 19.

The audio decoder 15 is used to decode audio data packets associated with video data (including alternative images) displayed on the display screen 14. In preferred embodiments of the invention, the audio decoder 15 comprises an AC3 audio decoder; however, other types of audio decoders may be used in conjunction with the present invention depending, of course, on the type of coding used to code the audio data. As shown in FIG. 2, the audio decoder 15 operates in accordance with audio control signals received from the CPU 19. These audio control signals include timing information and the like, and may include information for selectively outputting the audio data, as described in more detail below. Output from the audio decoder 15 is provided to the amplifier 16. The amplifier 16 comprises a conventional audio amplifier which adjusts an output audio signal in accordance with audio control signals relating to volume or the like input via the input devices 25. Audio signals adjusted in this manner are then output via the speakers 17.

The CPU 19 comprises one or more microprocessors, which are capable of executing stored program instructions (i.e., process steps) to control operations of the digital television receiver 2. These program instructions comprise parts of software modules (described below) which are stored in either an internal memory of the CPU 19 or in the ROM 24, and which are executed out of the RAM 21. These software modules may be updated via the modem 20 and/or via the MPEG-2 bitstream. That is, the CPU 19 receives data from the modem 20, and/or via the MPEG-2, bitstream which may include, but is not limited to, software module updates, video data (e.g., graphics data or the like), audio data, and a user profile. A user profile comprises information relating to one or more viewers of the digital television receiver 2, and is used in the method for selecting one of the alternative images described below. The user profile may be stored anywhere within the digital television receiver 2, but, in preferred embodiments of the invention, the user profile is stored in the non-volatile storage 22. In this regard, the non-volatile storage 22 may comprise a-flash EPROM, NVRAM, or the like, which is capable of being reprogrammed with, e.g., a new user profile, as desired.

At this point, it is noted that the invention may be implemented either (i) in a digital television system, such as that shown in FIG. 2, in which all control hardware is housed within the digital television receiver 2, or (ii) in a digital television system which includes both a digital television receiver and a set-top box. In the latter case, the CPU 19 above, or its substantial equivalent, may be housed in the set-top box, together with a memory that includes software modules executed thereby. In this case, the digital television receiver is controlled based on control signals from the set-top box, and will itself include one or more processors, such as the display processor 12 described above, for performing necessary control functions as well as video and audio display functions. Thus, although the invention can be implemented using different hardware configurations, for the sake of brevity, the following assumes that the hardware and software resides in the digital television receiver itself.

FIG. 2 shows examples of software modules which are executable within the CPU 19. As shown in FIG. 2, these modules include a control module 27, a user interface module 29, application modules 30, and an operating system module 31. The operating system module 31 controls execution of the various software modules running in the CPU 19 and supports communication between these software modules. The operating system module 31 may also control data transfers between the CPU 19 and various other components of the digital television receiver 2, such as the ROM 24. The user interface module 29 receives and processes data received from the input devices 25, and causes the CPU 19 to output control signals in accordance therewith. To this end, the CPU 19 includes the control module 27, which outputs such control signals together with other control signals, such as those described above, for controlling operation of the various components of the digital television receiver 2. The CPU 19 may also execute software modules (not shown) to decode video and audio data received from the transmitter. In the case that the CPU 19 has this capability, the demulitplexer 10 provides the video and audio data packets noted above to the CPU 19 which performs the functions of the video decoder 11 and the audio decoder 15. In this case, the video decoder 11 and the audio decoder 15 can be removed from the invention.

The application modules 30 comprise software modules for implementing various signal processing features available on the digital television receiver 2. The application modules 30 can include both manufacturer-installed applications, i.e., "built-in" applications, and applications which are downloaded via the modem 20 or, alternatively, in the video data stream. Examples of well-known applications that may be included in the digital television receiver 2 are an electronic program guide ("ECG") module and a closed-captioning ("CC") module.

In the present invention, the application modules 30 also includes an editing module 32 which may be either a built-in or downloaded software module. In brief, the editing module 32 receives or compiles a user profile for the digital television receiver 2, stores that profile in a memory, such as the non-volatile storage 22, selects one of the alternative images provided to the CPU 19 by the demultiplexer 10, and causes the display processor 12 to display the selected alternative image within a video sequence (e.g., a television program) output to the display screen 14. The editing module 32 also controls the output of audio information, if any, that corresponds to the selected alternative image.

Figure 3:
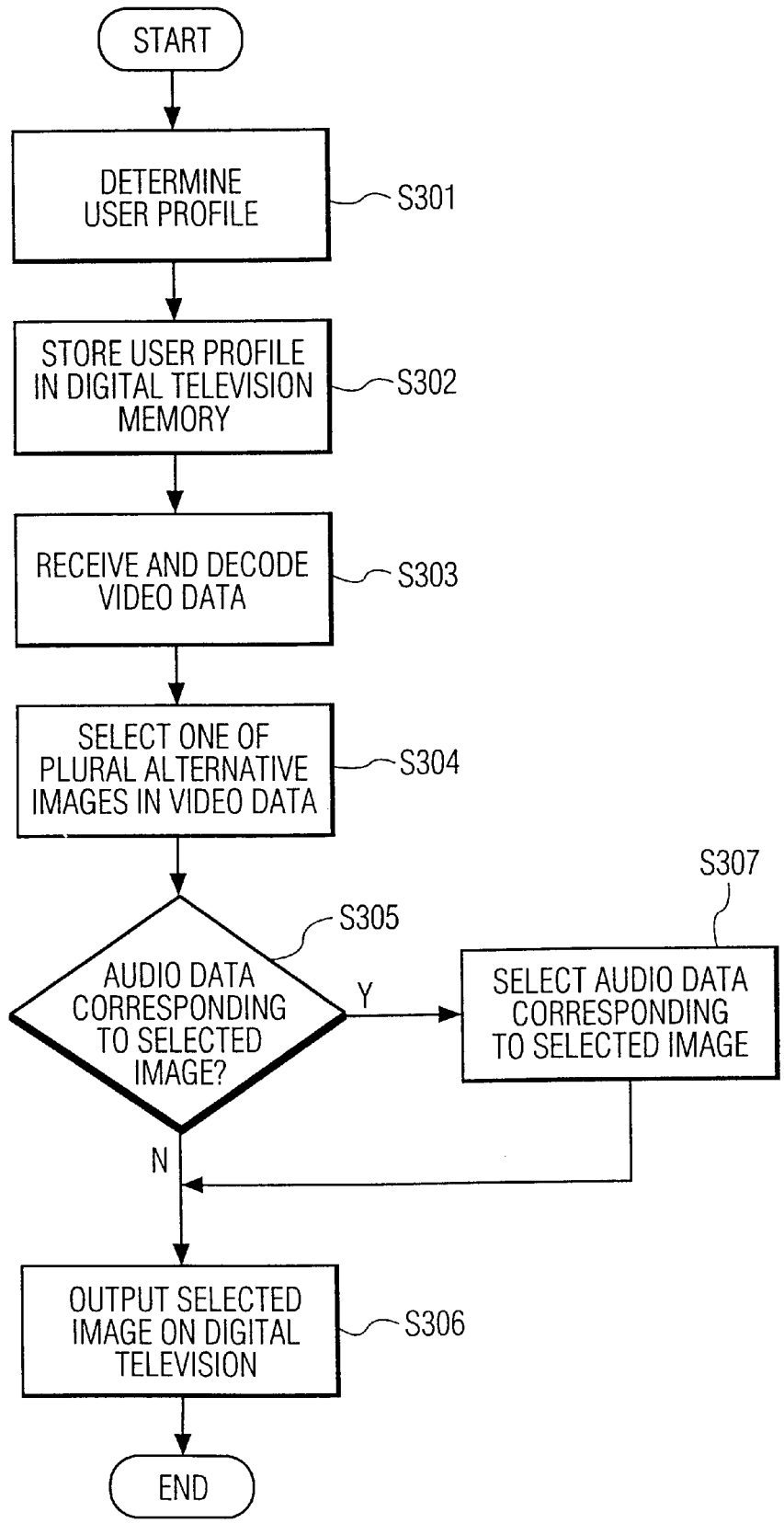
FIG. 3 is a flowchart depicting operation of the digital television receiver of FIG. 2.

FIG. 3 shows, in detail, processing performed by the editing module 32. More specifically, in step S301, the editing module 32 determines a user profile for the digital television receiver 2. In this regard, as noted above, the user profile comprises information specific to the digital television receiver 2 which is used in the selection of one of the alternative images. Information in the user profile may include a user's television viewing habits, such as which television programs that the user watches regularly, times of day that the user watches television, and commercials "zapped" (i.e., switched off); generic information, such as the user's zip code, telephone area code, neighborhood, and country; and user demographic information, such as the user's age, sex, yearly income, personal preferences, and personal habits. Any combination of the foregoing or any other relevant information may also be included within a user profile.

In some embodiments of the invention, different user profiles may be included in the digital television receiver for different viewers. In these embodiments, the appropriate user profile may be selected by, e.g., inputting a code corresponding to a particular viewer when the digital television receiver 2 is turned on. For simplicity's sake, however, the invention described herein will assume one user profile for the digital television receiver 2.

In the present invention, the user profile may be determined in one or more different ways. For example, a viewer may fill out an on-screen questionnaire using an input device. The user profile may then be based upon the answers provided in the questionnaire. Alternatively, the user profile may be determined at an external location, i.e., outside of the digital television receiver 2, and then downloaded to the digital television receiver 2 via the modem 20. As still another alternative, the digital television receiver 2 may itself compile the user profile. Specifically, the CPU 19 may do this by monitoring programming displayed on the digital television receiver 2 over a predetermined period of time (e.g., one month) and, based thereon, determine a user's viewing habits, preferences, etc. Such information may then be stored as the user profile for digital television 2. Combinations of the foregoing methods may also be used to determine the user profile. For example, a user may manually edit a profile determined automatically by the CPU 19; the user may request that the digital television receiver "fill in" missing answers of a questionnaire; etc.

Following step S301, processing proceeds to step S302, in which the user profile is stored in a memory, such as the non-volatile storage 22. Thereafter, step S303 receives, from the demultiplexer 10, data packets containing alternative images for display within a video sequence, and decodes video data in these packets if necessary. Next, step S304 selects one of the alternative images for display based on information in the user profile and based on information in the data packet corresponding to the selected image. More specifically, the data packets, received in step S304 containing alternative images, also contain information which can be correlated to parameters in the user's profile. Step S304, therefore, decomposes received data packets in order to obtain this information, and selects an alternative image in a data packet that has information which correlates to parameters in the user's profile.

By way of example, in the case of a soccer game being transmitted throughout Europe, data packets containing alternative advertising for each country may be included in the video data stream. Each such data packet may include information specifying the country in which an image stored in that packet is to be displayed. Similarly, digital televisions in each country may include a user profile specifying in which country the television is located. Thus, for a digital television receiver in Germany, for example, step S304 will review that digital television receiver's user profile and will determine that the digital television is located in Germany. Then, upon receiving the data packets containing alternative advertising, step S304 will decompose each received data packet in order to determine which of the data packets contains information specifying Germany. Once this has been determined, step S304 selects the image in the data packet containing information specifying Germany and disregards all other data packets.

A process similar to that described in the example above may be used to select images based, e.g., on user demographics data, personal preferences, habits, etc. For example, a data stream for a sporting event may include data packets containing alternative images which include "preference" information corresponding to preferred teams. Such packets will then be received in step S304, decomposed, and this preference information compared with parameters in the user profile in order to select one of the alternative images for display during the sporting event. Similar processes may be used to make the selection based on age, gender, etc. In addition, combinations of features may be used in the selection process. For example, data packets containing alternative images may include information indicating that particular images are preferred by males ages 18 to 49. In this case, step S304 will compare this information to both gender and age parameters in a user profile in order to determine if that image, or another image, should be selected.

In preferred embodiments of the invention, a default data packet containing a default image is also provided to the CPU 19. In these embodiments, this packet is selected in case that information in data packets including other images does not match any parameters in a user profile.

Once step S304 selects an image, processing proceeds to step S305. Step S305 determines if there is any audio information associated with the selected image. For example, in the case that the selected image is an image used in product placement, it is unlikely that there is corresponding audio information associated with the selected image. Accordingly, in such a case, processing proceeds to step S306. In step S306, the selected image is output to display processor 12, together with information concerning how and when in a video sequence the selected image is to be displayed. Thereafter, the display processor 12 superimposes data for the selected image in the data stream and displays the video sequence, including the selected image, on the display screen 14.

On the other hand, in the case that the selected image corresponds to a television commercial, it is likely that there is audio data associated with the selected image. In this case, therefore, processing proceeds to step S307. Step S307 selects portions of audio data which corresponds to the selected image. Thereafter, processing proceeds to step S306, in which the selected image is output as described above, and in which the selected portions of the audio data are then controlled by the CPU 19 to be output in sequence with the corresponding selected image. In this regard, it is noted that audio data corresponding to selected images may be contained within data packets for those images and then output by the CPU 19 to the audio decoder 15 or to the audio amplifier 16 depending upon whether the audio data is coded. Alternatively, data packets containing such audio data may be provided to the audio decoder 15 directly from the demultiplexer 10, and then selected by the CPU 19 based on which of the alternative images have been selected. Following step S306, processing ends.

Thus, revisiting the "soccer game" example provided above, using the present invention, it is possible for viewers in Germany to watch, e.g., a beer commercial in German, while viewers in Italy, at the same point in the soccer game, are watching a pasta commercial in Italian. Similarly, during an episode of a sitcom, if there is a cereal box on a table, using the invention, it is possible to change the logo on the cereal box to match the tastes of the people watching television, e.g., to change the logo from Lucky Charms® to Special K® or vice versa. Given the foregoing, using the invention, it is also possible to synchronize product placement and television commercials, thereby providing for more effective advertising.

Of course, those of ordinary skill in the art will recognize that the invention described herein is not limited to inserting advertising into television programs, and that the invention may be used in conjunction with inserting any graphics images within a video sequence in the manner described above. In this regard, the invention may be used in connection with selection of entertainment or educational programming based on information stored in the user profile. For example, in accordance with the invention, different television programs may be transmitted in different languages. Using the invention, it is possible to select a television program appropriate for a user of a digital television receiver based on the user profile. Similarly, the invention can be used in schools, or even in the home, to select educational television programming (e.g., one of several alternative television images) in accordance with information stored in the user profile.

The present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

What is claimed is:

1. A digital television system including a digital television receiver comprising:
   a memory for storing a user profile and computer-executable process steps;
   a display processor for receiving video data, and for providing the video data as a video sequence;
   a display for displaying the video sequence as a plurality of picture frames; and
   a controller for receiving video data corresponding to at least two alternative images, and for executing the process steps stored in the memory so as (i) to select one of the alternative images based on information stored in the user profile, and (ii) to cause the display processor to include the selected one of the alternative images within the video sequence, wherein the alternative images comprise images of objects in the video sequence, said selected image then appearing, on said display, integrally in the picture frames of the video sequence.

2. The digital television system as claimed in claim 1, wherein the information stored in the user profile is based on television viewing habits of a user of the digital television receiver.

3. The digital television system as claimed in claim 2, wherein the television viewing habits of the user are predetermined and then information corresponding thereto is stored in the user profile.

4. The digital television system as claimed in claim 2, wherein the controller determines the television viewing habits of the user by monitoring programming displayed on the digital television receiver over a predetermined period of time.

5. The digital television system as claimed in claim 1, wherein the user profile is based on user demographic information.

6. The digital television system as claimed in claim 1, wherein the digital television receiver further comprises an audio decoder for receiving audio data corresponding to the at least two alternative images, and for decoding selected portions of the audio data, said audio decoder providing said decoded selected portions in conjunction with the selected one of the alternative images.

7. A method for locally superimposing images in a video sequence, the method comprising the steps:
   storing a user profile containing information relating to a user of a digital television receiver;
   receiving video data defining the video sequence and video data defining at least two alternative images for display within the video sequence;
   selecting one of the alternative images based on the information in the user profile; and
   displaying the video sequence as a plurality of picture frames together with the selected one of the alternative images, wherein the alternative images are images of objects in the video sequence, said selected image then appearing integrally in the picture frames of the video sequence.

8. The method as claimed in claim 7, wherein the information stored in the user profile is based on television viewing habits of a user of the digital television receiver.

9. The method as claimed in claim 8, wherein said method further comprises the steps:

monitoring programming displayed on the digital television receiver over a predetermined period of time; and determining the user profile based on the programming monitored in the monitoring step.

10. The method as claimed in claim 7, wherein the user profile is based on user demographic information.

11. The method as claimed in claim 7, wherein said method further comprises the steps:

receiving audio data corresponding to the at least two alternative images;

selecting portions of the audio data; and outputting the selected portions of the audio data in correspondence with the selected one of the alternative images.

12. A digital television system comprising:

a transmitter for transmitting coded data, the coded data comprising video data for a video sequence and video data for at least two alternative images for display within the video sequence; and a digital television receiver for storing a user profile comprising information on a user of the digital television receiver, and for decoding the coded data received from the transmitter, said digital television receiver selecting one of the alternative images for display within the video sequence based on the user profile, wherein the alternate images comprise images of objects in the video sequence, said selected image then appearing, on display, integrally in picture frames of the video sequence.

13. The digital television system as claimed in claim 12, wherein the digital television receiver comprises:

a memory for storing the user profile and computer-executable process steps;

a display processor for providing the video data as the video sequence; and a controller for executing the process steps stored in the memory so as (i) to select one of the alternative images based on the information stored in the user profile, and (ii) to cause the display processor to include the selected one of the alternative images within the video sequence.

14. The digital television system as claimed in claim 13, wherein the coded data transmitted by the transmitter further comprises audio data corresponding to the at least two alternative images; and wherein the digital television receiver further comprises an audio decoder for decoding selected portions of the audio data, said audio decoder providing said decoded selected portions in conjunction with the selected one of the alternative images.

* * * * *